US011718484B2

(12) United States Patent
Stachel et al.

(10) Patent No.: US 11,718,484 B2
(45) Date of Patent: Aug. 8, 2023

(54) METHOD FOR TRANSVERSELY POSITIONING AN ARTICLE TO BE TRANSPORTED

(71) Applicant: MULTIVAC SEPP HAGGENMUELLER SE & CO. KG, Wolfertschwenden (DE)

(72) Inventors: Tom Stachel, Kempten (DE); Hans Christian Weiss, Dillenburg (DE)

(73) Assignee: MULTIVAC SEPP HAGGENMUELLER SE & CO. KG, Wolfertschwenden (DE)

( * ) Notice: Subject to any disclaimer, the term of this patent is extended or adjusted under 35 U.S.C. 154(b) by 15 days.

(21) Appl. No.: 17/523,159

(22) Filed: Nov. 10, 2021

(65) Prior Publication Data

US 2022/0144559 A1 May 12, 2022

(30) Foreign Application Priority Data

Nov. 11, 2020 (DE) .......................... 102020129750.5

(51) Int. Cl.
*B65G 47/08* (2006.01)
*B26D 3/24* (2006.01)
(Continued)

(52) U.S. Cl.
CPC ............. *B65G 47/084* (2013.01); *B26D 3/24* (2013.01); *B65G 15/50* (2013.01); *B65G 41/001* (2013.01);
(Continued)

(58) Field of Classification Search
CPC .... B65G 47/084; B65G 15/50; B65G 41/001; B65G 47/57; B65G 47/681;
(Continued)

(56) References Cited

U.S. PATENT DOCUMENTS 4,645,061 A * 2/1987 Welch .................... B65G 57/32
198/418.4
4,846,336 A * 7/1989 Hoyland .............. B65G 47/084
198/432

(Continued)

FOREIGN PATENT DOCUMENTS

DE 37 26 254 A1 2/1989
DE 42 20 602 C2 2/2001
(Continued)

OTHER PUBLICATIONS

European Search Report (with Partial English Machine Translation) dated Mar. 29, 2022, Application No. 21206389.5-1017 , Applicant MULTIVAC SEPP Haggenmueller SE & Co. KG, 10 Pages.

(Continued)

*Primary Examiner* — Mark A Deuble
(74) *Attorney, Agent, or Firm* — Brooks Kushman P.C.

(57) ABSTRACT

In order to be able to shingle articles individual slices or partial portions of slices shingled in a longitudinal direction in a transverse direction relative to the running direction of conveyor units on which these articles are transported, the two conveyor units, on each of which one of the two articles is fully supported, are not brought to overlap in order to achieve the transverse shingling, but one of the articles is transported on its conveyor unit with a lateral overhang to the other conveyor unit, and the other article placed there on the edge side with such a height difference that the two articles can finally overlap and be placed on top of each other. However, the two conveyor units only have to be guided closely next to each other for this purpose without overlapping themselves. This simplifies the design of the overlapping unit and reduces its overall height.

20 Claims, 15 Drawing Sheets

(51) Int. Cl.
*B65G 15/50* (2006.01)
*B65G 41/00* (2006.01)
*B65G 47/57* (2006.01)
*B65G 47/68* (2006.01)

(52) U.S. Cl.
CPC ............ *B65G 47/57* (2013.01); *B65G 47/681* (2013.01); *B65G 2201/0202* (2013.01)

(58) Field of Classification Search
CPC ...... B65G 2201/0202; B65G 2201/022; B65G 47/26; B65G 57/32; B65G 47/082; B65G 47/086; B65G 47/088; B26D 3/24; B26D 2210/02; B26D 7/32
See application file for complete search history.

(56) References Cited

U.S. PATENT DOCUMENTS

| | | | | |
|---|---|---|---|---|
| 6,935,215 | B2* | 8/2005 | Lindee | B26D 7/32 |
| | | | | 83/155 |
| 9,221,615 | B2* | 12/2015 | Bauer | B26D 7/32 |
| 9,643,794 | B2* | 5/2017 | Wipf | B65G 47/71 |
| 9,809,401 | B2* | 11/2017 | Mayer | B65G 47/084 |
| 10,065,335 | B2 | 9/2018 | Mayer et al. | |
| 10,737,403 | B2 | 8/2020 | Bauer et al. | |
| 11,198,565 | B2* | 12/2021 | Fox | B26D 7/32 |
| 2004/0016331 | A1 | 1/2004 | Wolcott et al. | |
| 2006/0054463 | A1* | 3/2006 | Walker | B65G 47/8869 |
| | | | | 198/607 |

FOREIGN PATENT DOCUMENTS

| | | |
|---|---|---|
| DE | 10 2014 106 400 A1 | 11/2015 |
| DE | 10 2014 113 738 A1 | 3/2016 |
| DE | 10 2015 104 055 A1 | 9/2016 |
| EP | 3 348 501 A1 | 7/2018 |

OTHER PUBLICATIONS

German Search Report dated Oct. 4, 2021, Application No. 10 2020 129 750.5, Applicant MULTIVAC Sepp Haggenmueller SE & Co. KG, 6 Pages.

* cited by examiner

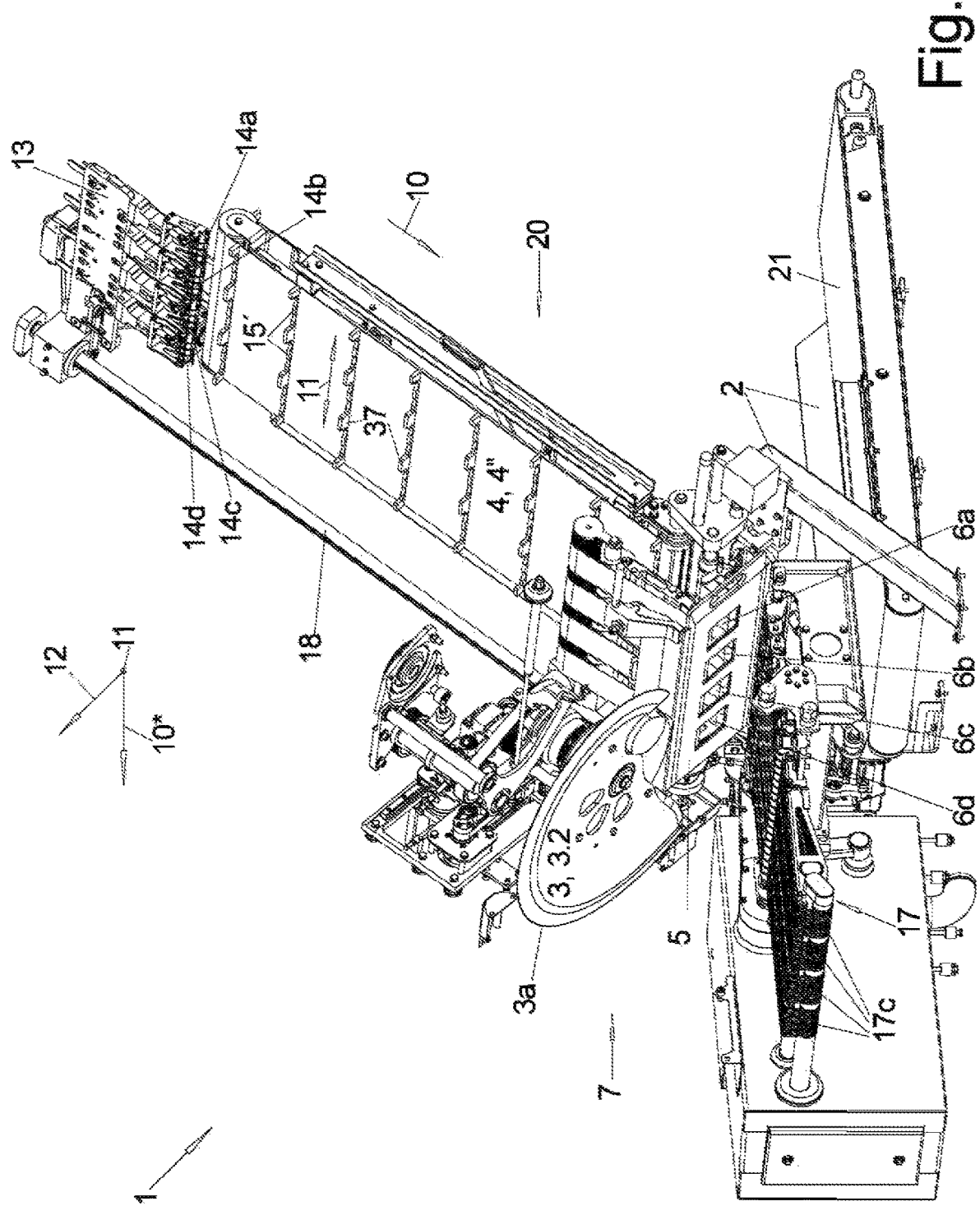

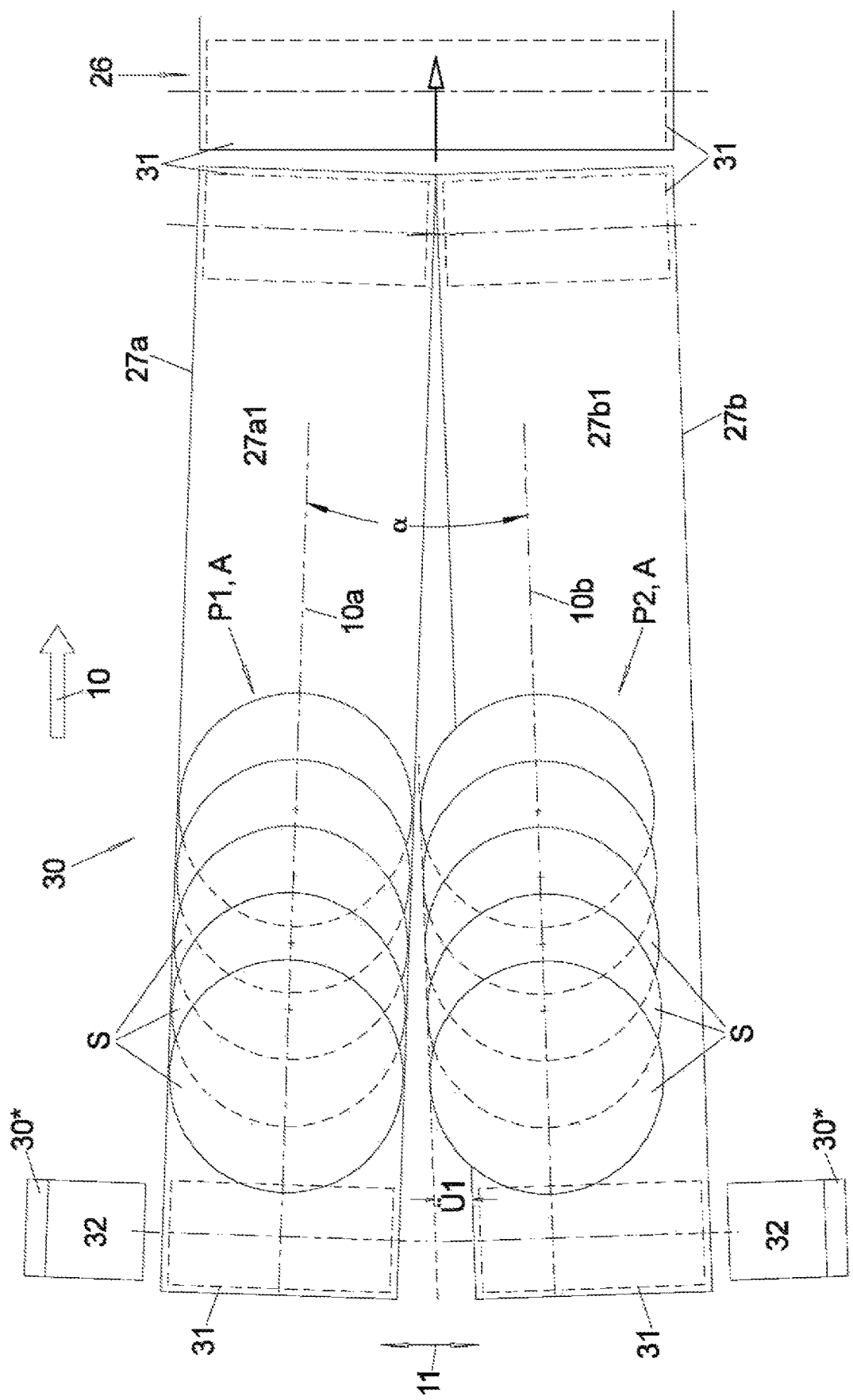

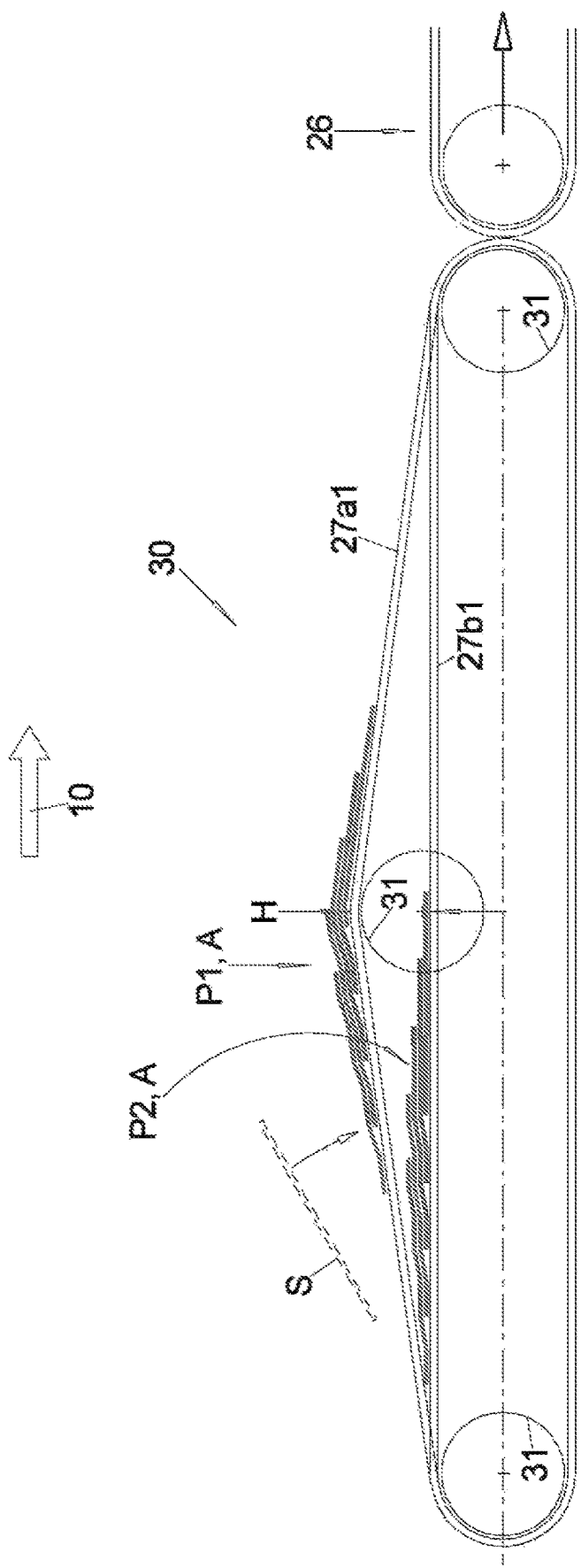

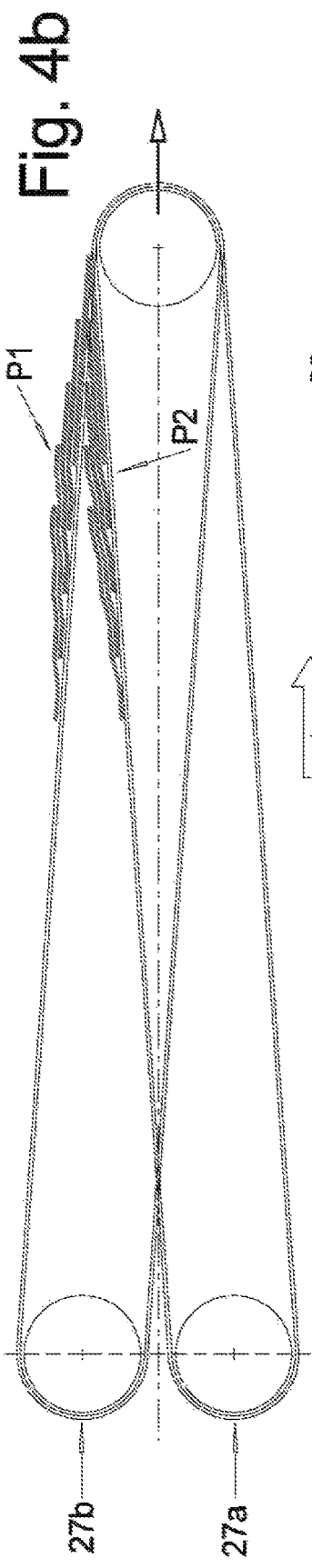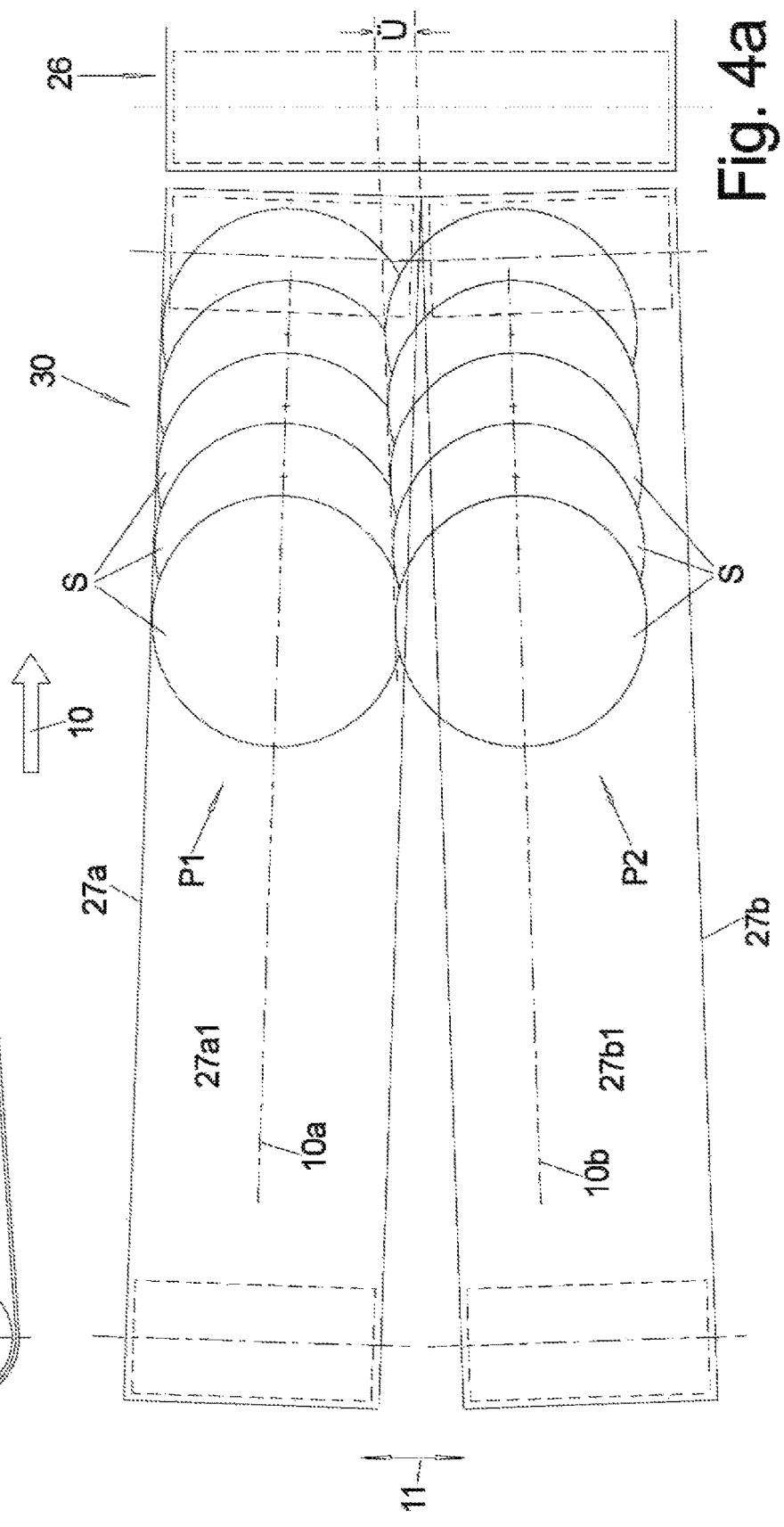

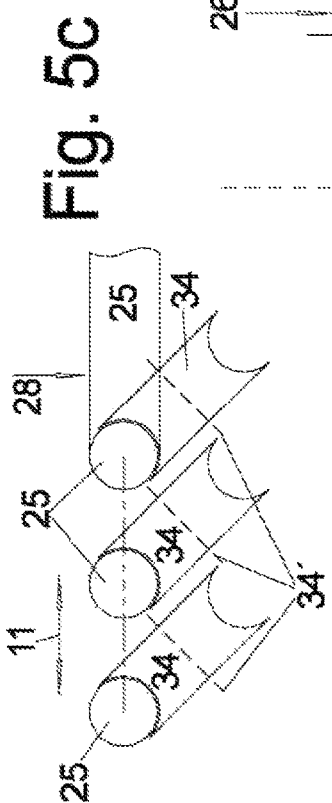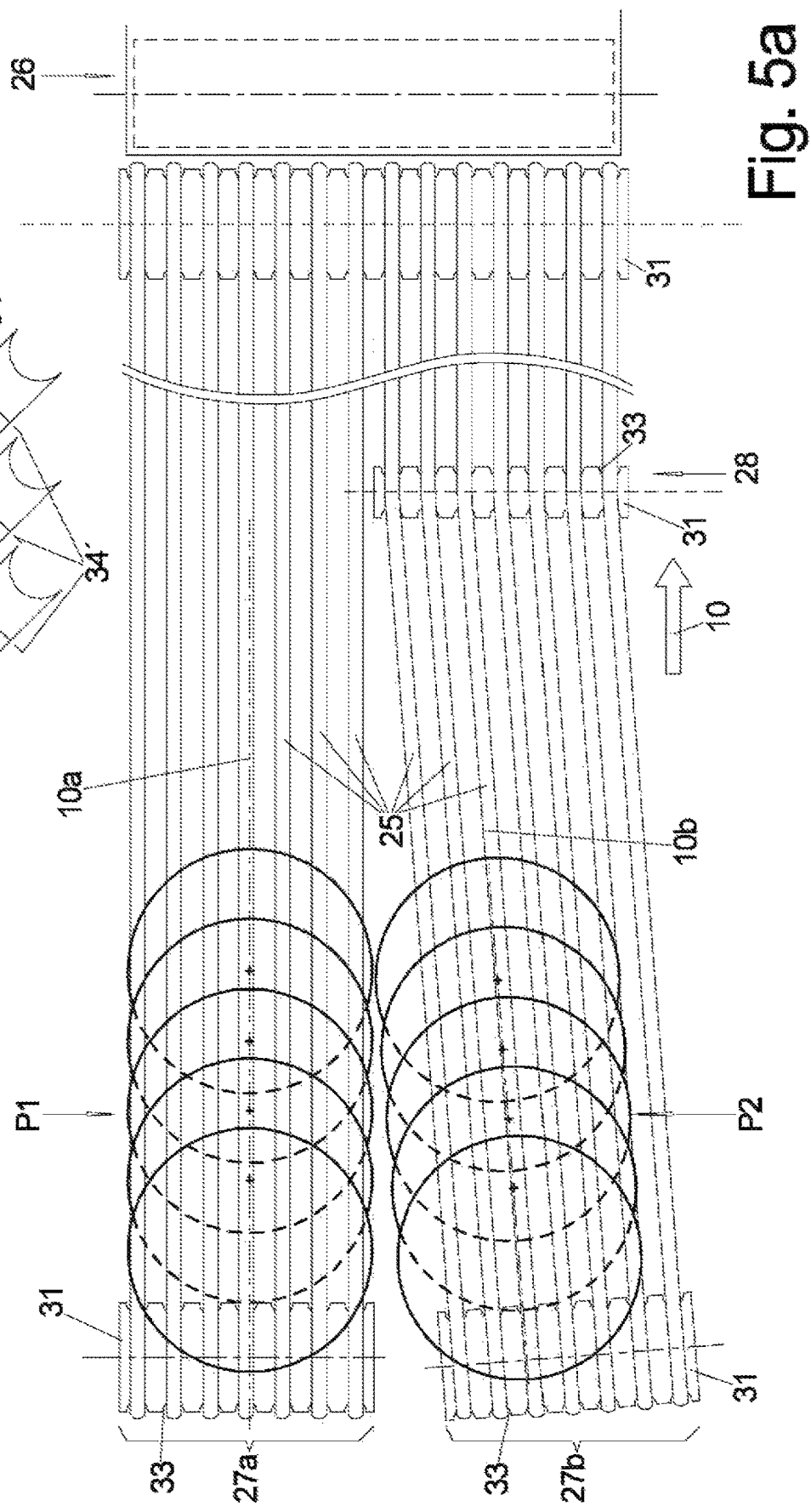

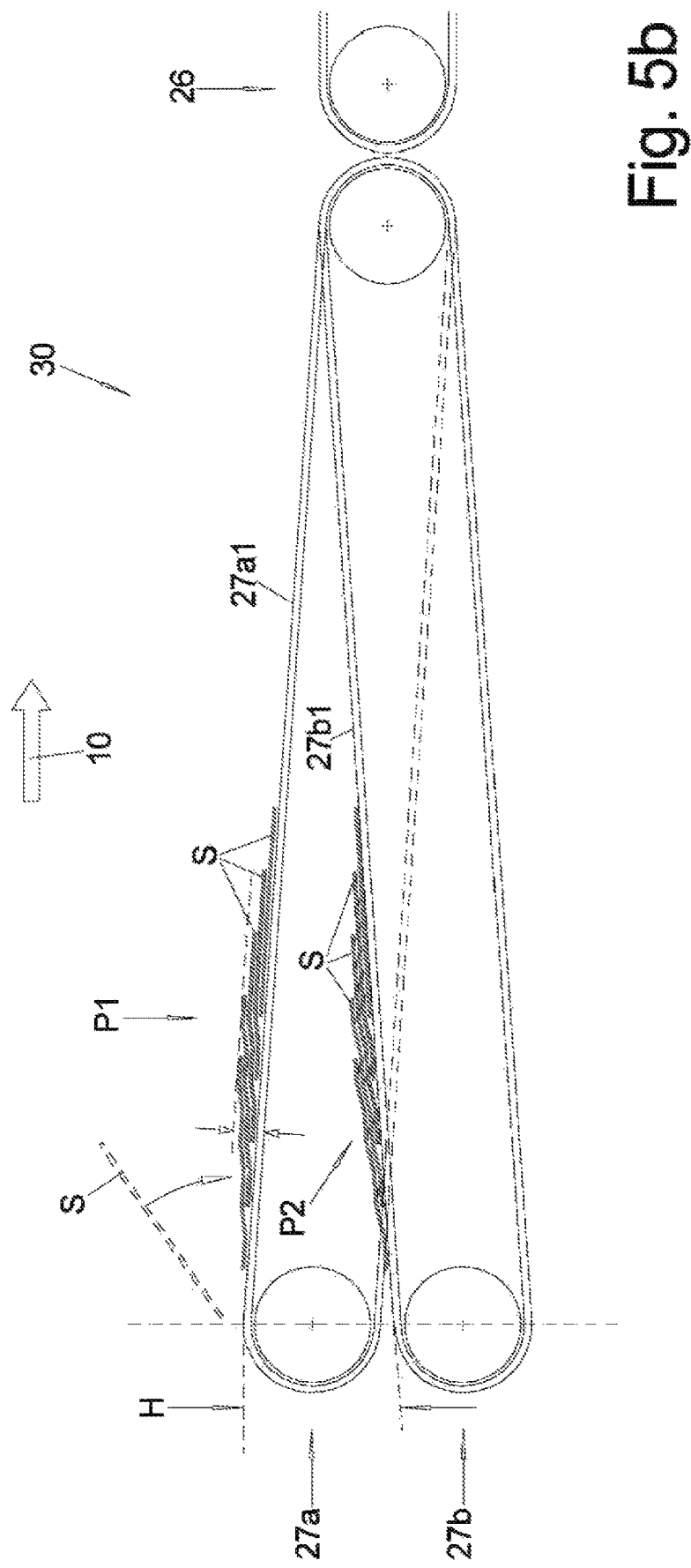

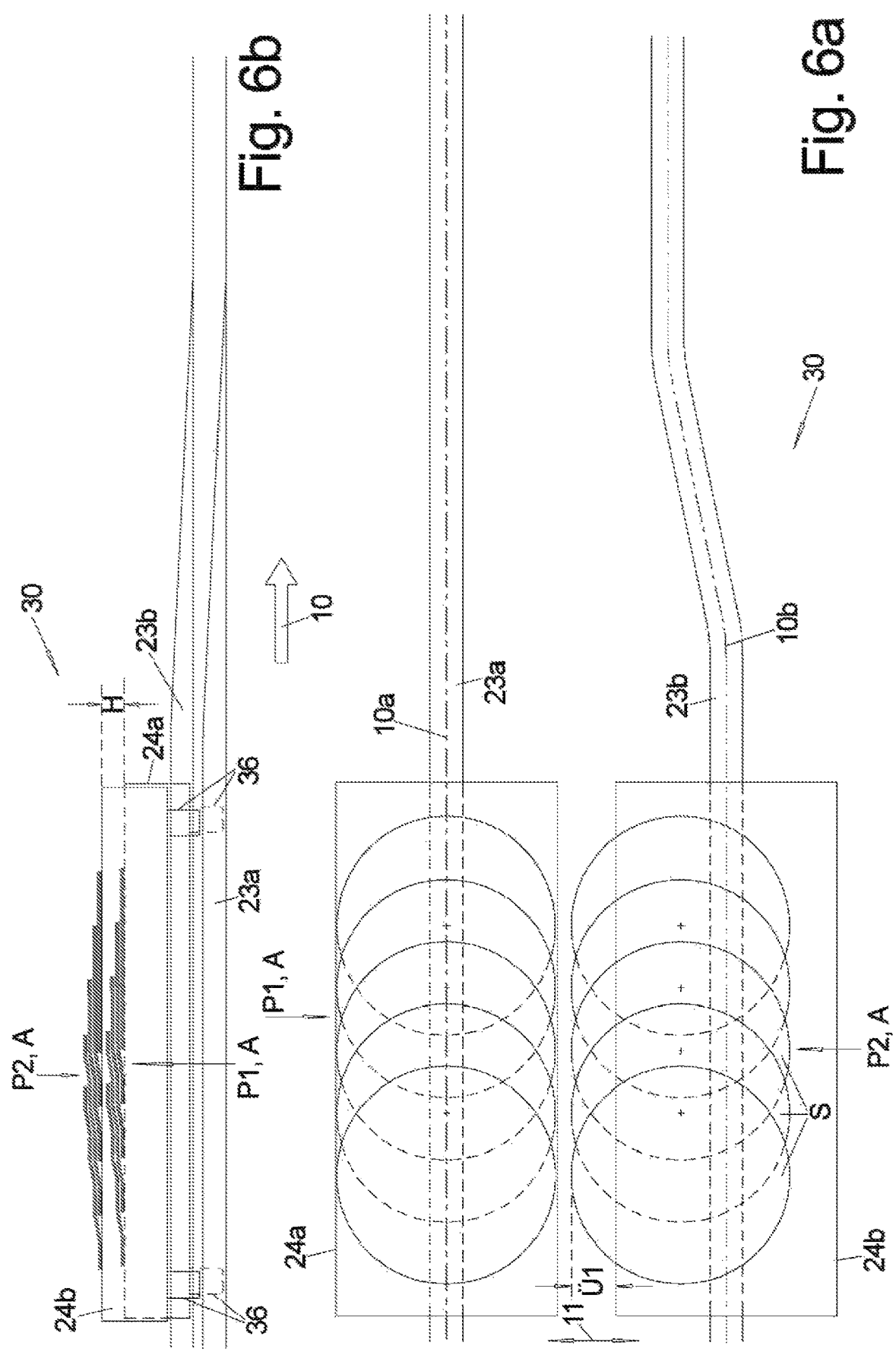

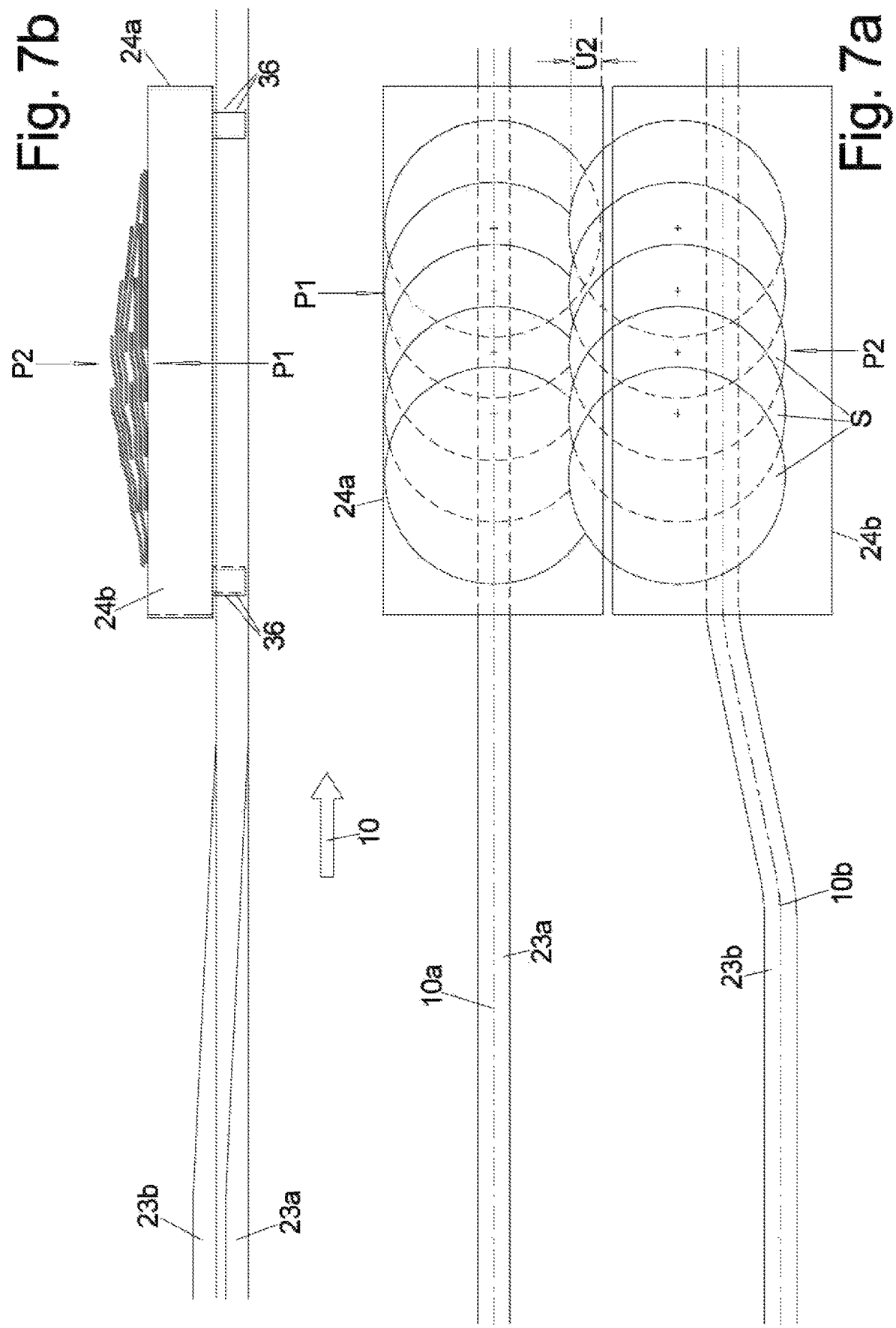

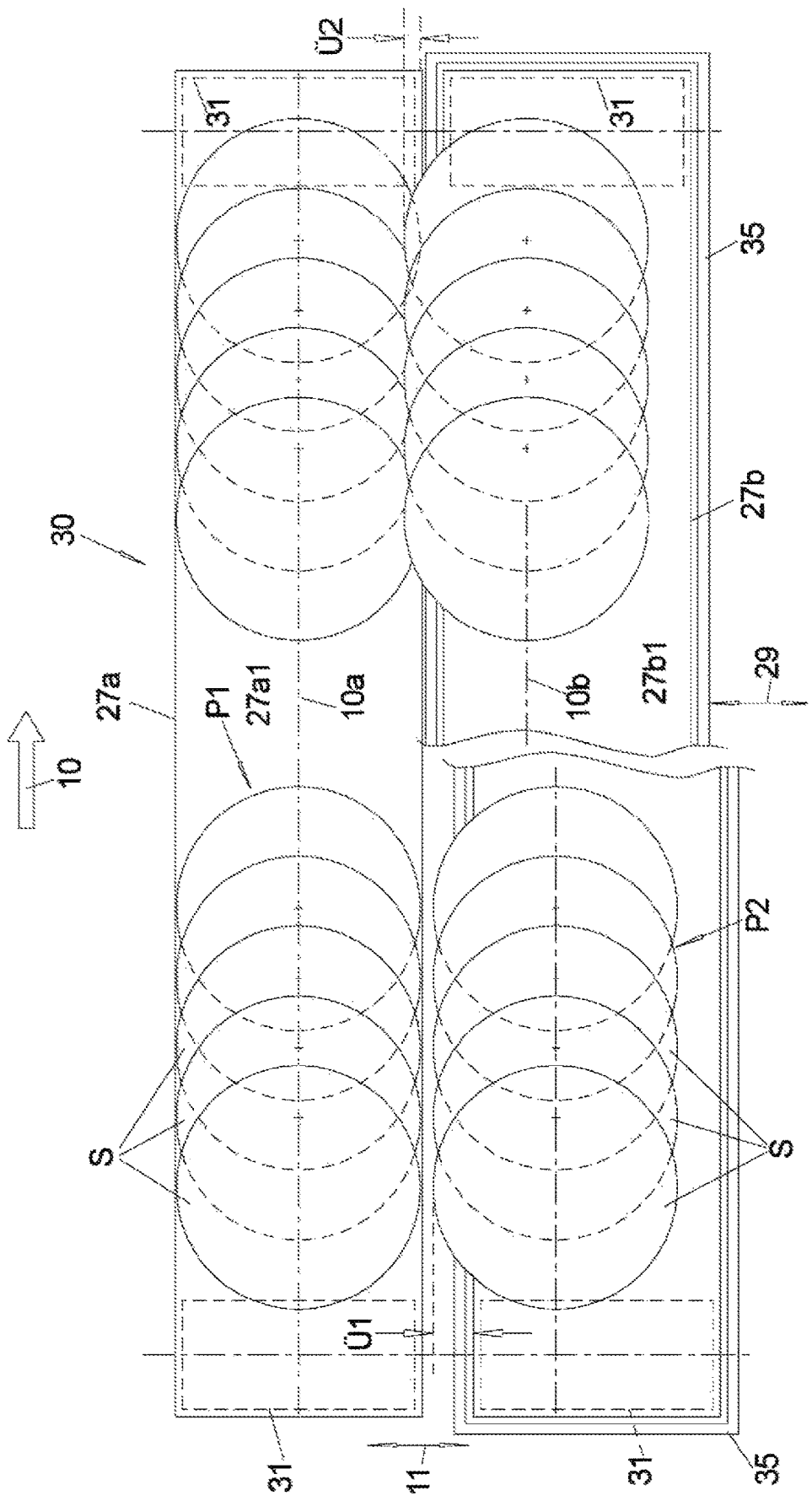

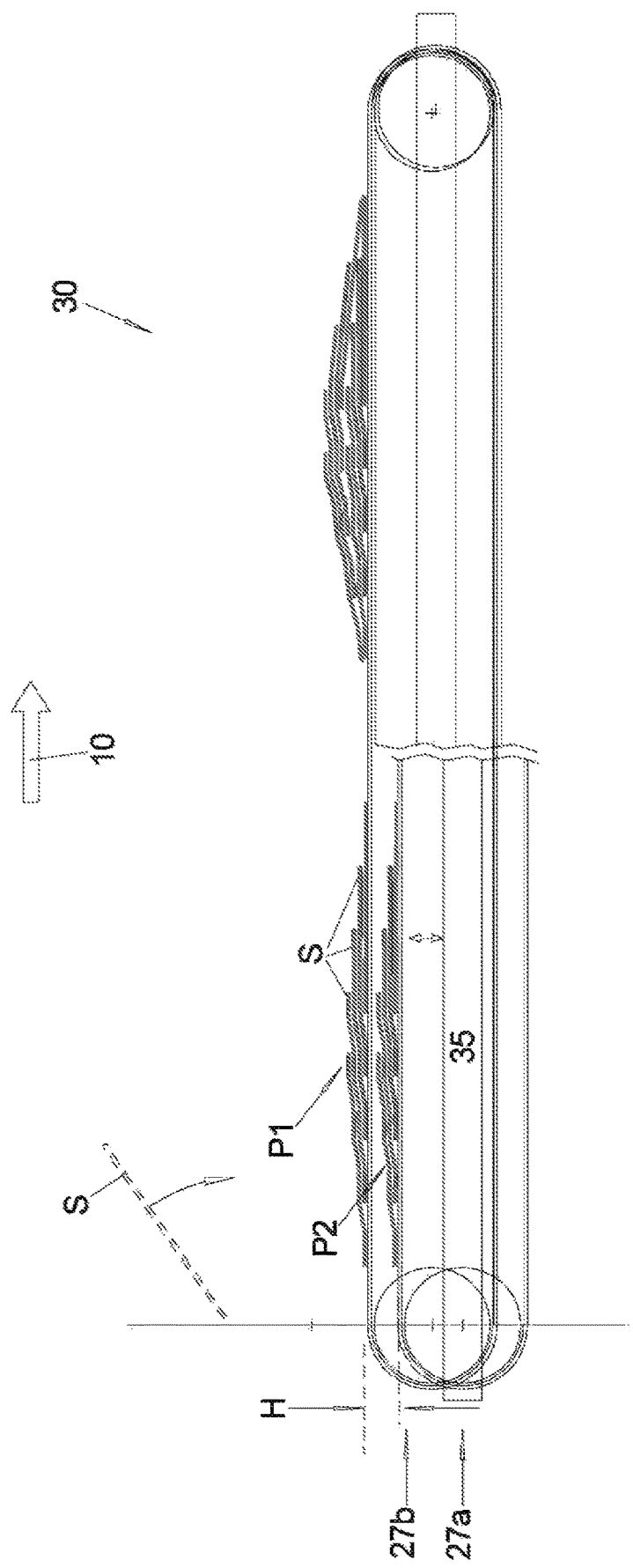

METHOD FOR TRANSVERSELY POSITIONING AN ARTICLE TO BE TRANSPORTED

CROSS-REFERENCE TO RELATED APPLICATIONS

This application claims priority to German Patent Application No. DE 10 2020 129 750.5 filed on Nov. 11, 2020, the disclosure of which is incorporated in its entirety by reference herein.

TECHNICAL FIELD

The invention relates to slicing machines, in particular so-called slicers, which are used in the food industry to slice strands of an only slightly compressible product such as sausage or cheese.

BACKGROUND

Since these strands can be produced with a cross section that retains its shape and dimensions well over its length, i.e., essentially constant, they are called product calibers.

In most cases, several product calibers are cut side by side at the same time by cutting one slice at a time by the same blade, which moves in a transverse direction to the longitudinal direction of the product calibers.

The product calibers are pushed forward by a feed conveyor in the direction to the blade, usually on an downwardly inclined feed conveyor, and guided in each case through the product openings of a so-called cutting frame, at the front end of which the part of the product caliber projecting beyond it is cut off as a slice by the blade immediately in front of the cutting frame.

The slices generally falls onto a discharge conveyor unit, by means of which they are transported away for further processing.

Depending on the—intermittent—controlled move of the first conveyor belt of this discharge conveyor unit onto which the slices fall, the so-called portioning belt, either individual slices are transported off by this portioning belt, or the portioning belt is controlled moved intermittently in such a way that slices cut from one caliber are deposited there one after the other as a portion shingled in longitudinal direction, i.e., with slices partially overlapping in longitudinal direction.

In addition, packages of sliced sausage or cheese are known in which such longitudinally shingled strips as partial portions additionally overlap in transverse direction and are transversely shingled to form a complete portion.

Up to now, this has mostly been done by hand or by means of machines—which are then usually no longer part of the slicing machine, but a separate machine installed downstream, which is called an overlapping unit here—in which the individual belts that feed the longitudinally shingled partial-portions are partially guided on top of each other and discharge their partial portions onto an underlying continuing belt and, during this discharge, the partial portions shingled in the longitudinal direction are additionally shingled transversely overlapping in the transverse direction, as is known, for example, from DE 10 2015 104 055 A1, see there in particular FIG. 9.

Because of the large throw, this always represents a considerable risk, and the overlapping unit builds high and the control as well as the construction are complicated.

SUMMARY

It is therefore the object according to the invention to provide such an overlapping unit as well as a slicing machine, in particular a slicer, equipped therewith, which are of simpler construction than previous solutions, as well as a method for operating such an overlapping unit.

With regard to the method for the transverse shingling of individual slices or also longitudinally shingled partial portions—generally referred to as articles—the two conveyor units located next to one another transversely to the transport direction with the article thereon are arranged according to the invention at least at the end of their transport distance in the transverse direction, viewed in plan view, are arranged so closely next to one another that the article projecting laterally over its conveyor unit projects beyond the other article on the other conveyor unit in the transverse direction, i.e., has an overlap with respect thereto. For this purpose, a difference in height of the contact surfaces of the two conveyor units of at least the height of the lower article is required.

Since, in contrast to the state of the art, the entire conveyor units do not overlap, the structure has a lower overall height and is also easier to build.

After that the height difference between the two support surfaces is reduced again so that the two articles come into contact with each other in the overlap area and lie there on top of each other.

As soon as the overlap has been established in the transverse direction, i.e., after or even before the two articles come into contact with each other, the two conveyor units can deliver their articles in the transport direction to a subsequent conveyor unit, such as a—preferably wider—conveyor belt, preferably simultaneously, on which the two longitudinally shingled partial portions then lie in the transverse shingled state as a complete portion and are transported away.

In order to avoid a relative movement between the two articles, the two conveyor units with the articles, i.e., the part portions, are driven synchronously thereupon at the latest from the time of contact of the two articles.

The overlap can be achieved in different ways:

A first possibility is that, viewed in plan view, the two conveyor units do not run parallel to each other, but at least in a partial area, but preferably over their entire length, runs at an acute intermediate angle of, in particular, a maximum of 30°, preferably a maximum of 20°, preferably a maximum of 15° to each other, especially if these are belt conveyors whose running directions converge in the transport direction. In this way, the overlap can be created with little constructional effort.

A second possibility is to move such a conveyor unit together with the article lying on it in transverse direction in direction to the other conveyor unit until the desired overlap is achieved.

In this way, the degree of overlap can be infinitely varied and adjusted, but the construction effort for a conveyor belt, for example, which can also be moved in a controlled manner in the transverse direction, is higher than for a conveyor belt which cannot be moved in the transverse direction.

If a transfer to a downstream conveyor unit is to be avoided after the desired degree of overlap has been achieved, the two conveyor units on which the two articles were fed can be continued not only synchronously but also parallel to each other after overlap and mutual contact, for which a change in the running direction is necessary for at least one of the two conveyor units.

Avoiding the transfer to a downstream conveyor unit saves its additional drive and control.

From the vertical contact of the articles, one article lies completely on one conveyor unit and the other, upper article lies largely on the other, now parallel-running, conveyor unit, but with its overlapping area—indirectly, with the lower article in between—on the first-mentioned conveyor unit.

With belt conveyors, such a change of running direction is difficult to realize, especially if areas with straight running directions are to follow before and after.

With link conveyors or strap conveyors, such as round strap conveyors, such a deflection is relatively easy, e.g., by means of a support roller with circumferential grooves in the area of the change of direction, in which the straps are accommodated in the circumferential grooves so deeply that they cannot jump out despite the change in direction. Instead, individual deflecting rollers can also be used for each belt, whose roller axis is at an angle to the supporting surface of this strap conveyor, which additionally reduces friction and wear compared to the individual strap.

It is even easier to achieve the overlap if individual slides are used as conveyor units, on each of which an article rests and is transported, since the running direction of these slides—regardless of whether they are guided positively in a guide track or are controlled to travel freely on the ground—can then be changed very easily from a running direction leading inclined towards each other to running directions lying parallel to each other. However, such slides, which can be controlled and moved independently of each other, require more space.

The required lateral overhang of one article beyond the edge of its support surface is generally achieved by placing this article in a corresponding transverse position on the conveyor unit.

Depending on the application, however, it may be advisable for the article to lie completely on the support surface of a conveyor unit without any lateral overhang at first and to obtain its lateral overhang only afterwards.

In order not to require a transfer from one conveyor to a subsequent conveyor for this purpose, the support surface of this conveyor unit can become narrower downstream of the article feed point from the side on which the overhang is desired, i.e., the outer edge of the support surface can approach the transport direction.

This is possible, for example, with strap conveyors that initially run at an acute angle to one another, in that, for example, in the case of a strap conveyor, the outermost strap along the transport distance of this strap conveyor ends before the other straps, i.e., is deflected into the return run, whereby this can also be carried out with several straps from the outermost strap inwards. Another possibility is that this outermost strap or the several outermost straps of a strap conveyor in the transport direction increasingly approach the other straps in the transverse direction, which however causes a slip with respect to the article resting on it in this edge area.

The necessary difference in height between the supporting surfaces on both sides of the two conveyor units can be achieved by ensuring that the two supporting surfaces already have at least this difference in height at the upstream end, but this can make it difficult to load the articles.

The preferred solution is therefore to position the two conveyor units in the upstream end section with their support surfaces at the same height and at a distance from each other in the transverse direction, and to bring them to the necessary height difference to each other only along their transport distance, in particular in the middle area of the transport distance.

In the downstream end area, the height difference can be reduced again to a level where the two articles lie on top of each other in the overlap area.

Another possibility combines the achievement of the overlap with the achievement of the necessary height difference of the two supporting surfaces:

If the two conveying units, for example belt conveyors, are arranged with their supporting surfaces at the same height at the upstream end, the two conveying units, in particular conveyor belts, can also run parallel to each other from the start, which is possible in particular if the two articles to be overlapped in transverse direction are placed with a time delay relative to each other on the two conveying units running next to each other and which can be driven synchronously, i.e., are first placed on them offset relative to each other in longitudinal direction.

One article is then placed over its entire width on one conveyor unit, while the other article is placed behind it, overlapping in the transverse direction, partly on one conveyor unit and partly on the other conveyor unit, whereby the lateral overlap has already been achieved.

If now the one conveyor unit runs with its supporting surface upwards, on which the article is only partially resting, then this article lifts off the other conveyor unit, on which the other article is completely located. Up to this point, the two conveyor units should of course run at the same speed in the direction of transport.

If subsequently the two conveyor units are driven at a differential speed—whereby one of them can also stand still—until the two articles have reached the same longitudinal position, i.e., are arranged overlapping each other at different heights, then from this point onwards the two conveyor units can again be arranged synchronously and after reducing the height difference or after transfer to a downstream conveyor unit the two articles lie on top of each other shingled in the transverse direction as desired.

It should be clear that transverse shingling is not limited to two transversely shingled articles, but that three transversely shingled articles or partial portions can also form a portion, in that in particular the middle article lies at the bottom in the finished state and is overlapped in its two edge areas by the respective lateral edge of a respective other article offset to the left and right of it.

It is also possible to achieve articles that are transversely shingled more than three times in the same direction, although the lateral offset required to achieve the overlap from placement on its conveyor unit to contact with the adjacent article increases with each additional article, which makes implementation more difficult.

The necessary height difference between the contact surfaces depends not only on the thickness of the article at the bottom during overlapping, but also and above all on the extent to which the projecting edge area of the article only partially resting on a conveyor unit hangs down.

Since this depends on the stiffness of the article and this depends on further physical parameters such as the temperature and consistency of the article, the relevant physical parameters of the articles, at least of the article lying on top after overlapping, are preferably determined, for example the bending stiffness of the article about an axis directed in the running direction,
and/or
its temperature, and/or
its weight,
and/or
its water content, derivable from its electrical conductivity.

The parameters determined can be used by the control to automatically control, for example, the required height difference between the two support surfaces, because the less rigid the upper of the two articles is and the further it hangs down in its lateral overhang, the greater the height difference must be selected.

The desired degree of overlap, on the other hand, is usually entered manually or automatically into the control, and is also taken into account by the control, preferably automatically, to control the necessary degree of height difference.

With regard to the overlapping unit for the transverse shingling of articles, this first of all comprises, as is known, two conveyor units which, viewed from above, are located next to one another in the running direction and whose supporting surfaces are spaced apart, at least over a certain limited area in the longitudinal direction, i.e., one of the running directions of the two conveyor units, by a height difference which corresponds at least to the height of the article on which the other article is to be rested partially.

Furthermore, such an overlapping unit comprises a control for controlling the moving parts of this overlapping unit.

According to the invention, the existing object is solved by the overlapping unit in that, viewed from above, the conveyor units themselves are not overlapping in the running direction, but are or can be arranged only over a longitudinal region of their transport distance so close together that the article resting only partially on one of the two conveyor units can overlap the article resting on the other conveyor unit, usually close to its edge, to the desired extent in the transverse direction.

In this way, the height difference between the supporting surfaces of the two conveyor units no longer has to be at least equal to the overall height of the entire conveyor unit, as in the known solution in which the two conveyor units themselves overlap each other, but only by at least the height of the lower article after overlapping or slightly more.

The control of such an overlapping unit must be intended and appropriately embodied to carry out the prescribed method for transverse-shingling by this overlapping unit.

The constructional effort for such an overlapping unit is considerably lower than for the known embodiments. The embodiment of such an overlapping unit varies depending on how the necessary height difference is achieved or whether a subsequent transfer to another conveyor unit is desired immediately after the overlap has been reached:

In one embodiment, the running directions of the two conveyor units, viewed in plan view, can be aligned with each other at an acute intermediate angle, which is preferably a maximum of 30%, preferably a maximum of 20%, preferably a maximum of 15%.

If the support surfaces are offset from each other by the required height difference, this approach of the two conveyor units in the transport direction creates the overlap in a simple manner.

After this, i.e., after the lateral overlap has been achieved, the running directions of the two conveyor units can be aligned parallel to each other again, in particular by a corresponding conveyor belt as a conveyor unit changing its running direction which, as described above, is particularly possible with link conveyor belts or strap conveyors, especially round strap conveyors, and all the more so in the case of a conveyor unit consisting of individual, preferably independently controllable, transport slides, irrespective of whether these are track-guided or freely movable on a running surface.

It is not necessary to change the running directions of the two conveyor units if they run parallel to each other from the start, even in the area where the overlapping of the two articles lying on them is reached.

This is possible if the overlapping unit, at least in the case of one of the two conveyor units, in particular in the form of a conveyor belt, has a transverse displacing device by means of which this conveyor unit, in particular this conveyor belt, can be displaced as a whole in the transverse direction towards the other conveyor belt on which the other article lies over its entire surface, naturally only after there has been a corresponding difference in height between the contact surfaces on both sides.

If the overlapping unit is further embodied in such a way that the two conveyor units can be driven independently of each other with regard to their conveying speed and also with regard to their stopping and restarting, two conveyor belts or also two parallel moving transport slides can, for example, be arranged with their supporting surfaces lying at the same height at the upstream end of the transport distance, if the overlapping unit is embodied in such a way that the two articles can be deposited on the conveyor units in a time-shifted manner, with the necessary lateral overlap from the start, but spaced apart from one another in the longitudinal direction.

Then, after creating the height difference between the support surfaces, the two articles can be positioned on top of each other and, after reducing the height difference if required, can be deposited on top of each other again immediately afterwards in a transverse-shingled manner.

To achieve the height difference, the upper runs of the two conveyor belts can be guided differently in terms of height when the conveyor units are embodied as belt units, i.e., they can be arranged at the same height at the start at the upstream end and moved apart in terms of height downstream therefrom, or the upstream ends of the two support surfaces can be spaced apart in height from the start by the required height difference.

Such an overlapping unit can be an independent machine arranged in a processing line downstream of the e.g., slicing machine for slicing product calibers into slices, or it can be a component of such a slicing machine.

Then the existing object for a slicing machine is solved by the fact that it already contains an overlapping unit, in particular that at least two of the discharge conveyors of the discharge units of such a slicing machine, which are adjacent to each other as seen in plan view and with which the slices are discharged, are the conveying units of the overlapping unit and are correspondingly embodied, arranged and controllable.

BRIEF DESCRIPTION OF THE DRAWINGS

Embodiments according to the invention are described in more detail below by way of example. They show:

FIG. 5c: another embodiment of the deflecting unit, FIGS. 6a, b: a fourth embodiment of an overlapping unit in plan view and side view at the beginning of the overlapping process, FIGS. 7a, b: the fourth embodiment of the overlapping unit in plan view and side view at the end of the overlapping process, FIGS. 8a, b: a fifth embodiment of the overlapping unit in plan view and side view.

DETAILED DESCRIPTION

Figure 1B:
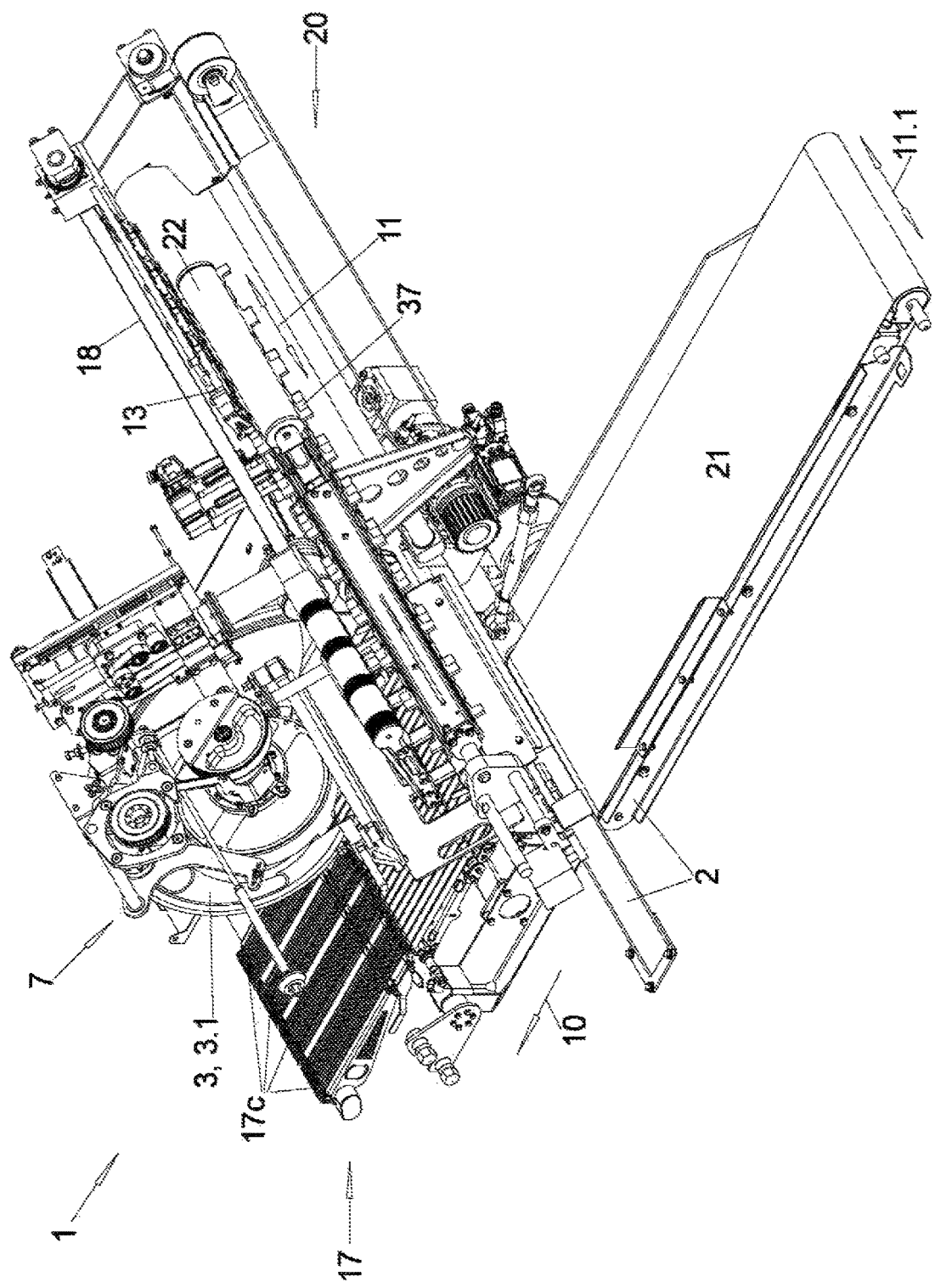
FIGS. 1a, b: a slicing machine in the form of a slicer according to the prior art in different perspective views.
FIG. 1c: the slicing machine of FIG. 1a, bin side view.
Figure 1C:
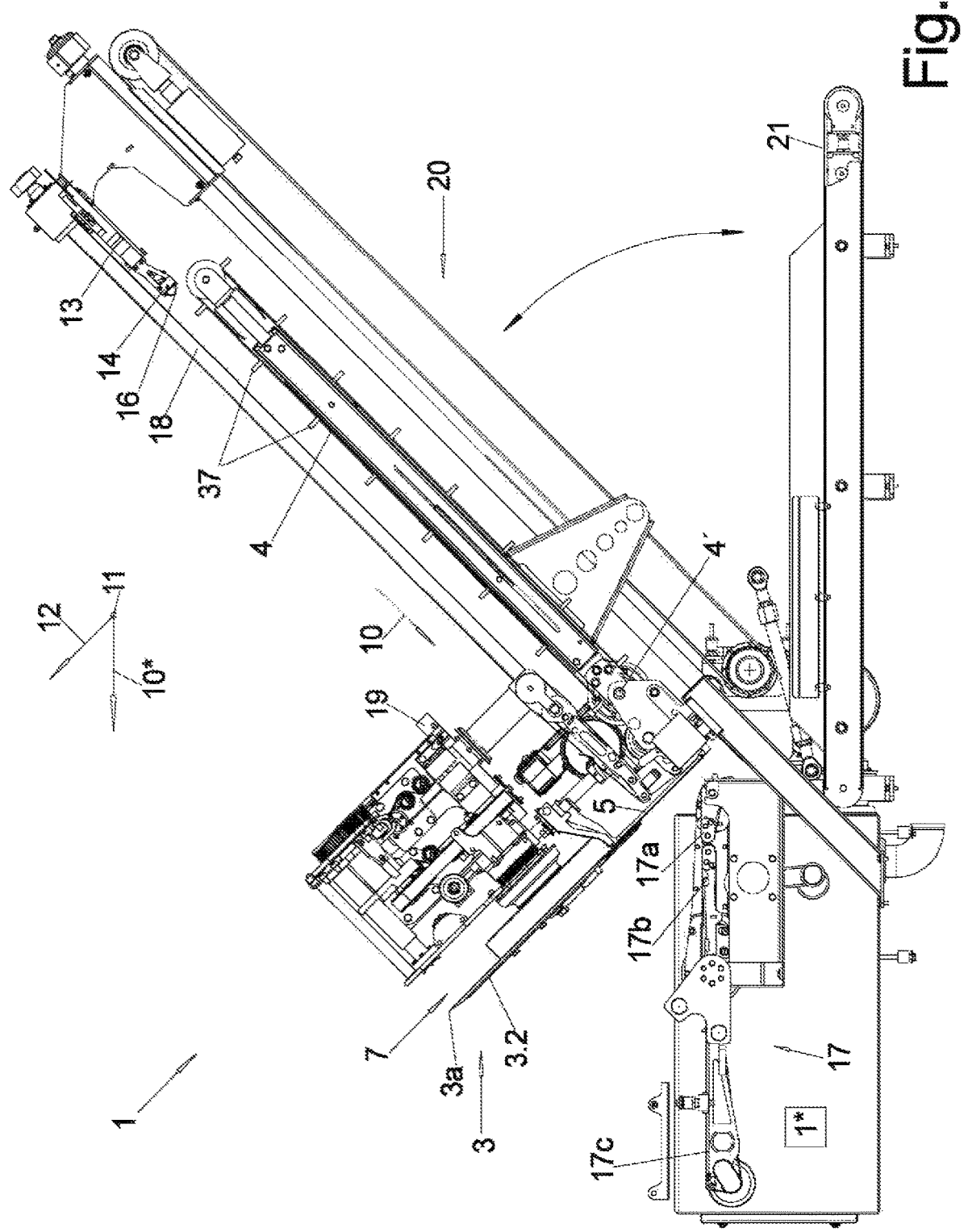
Figure 2A:
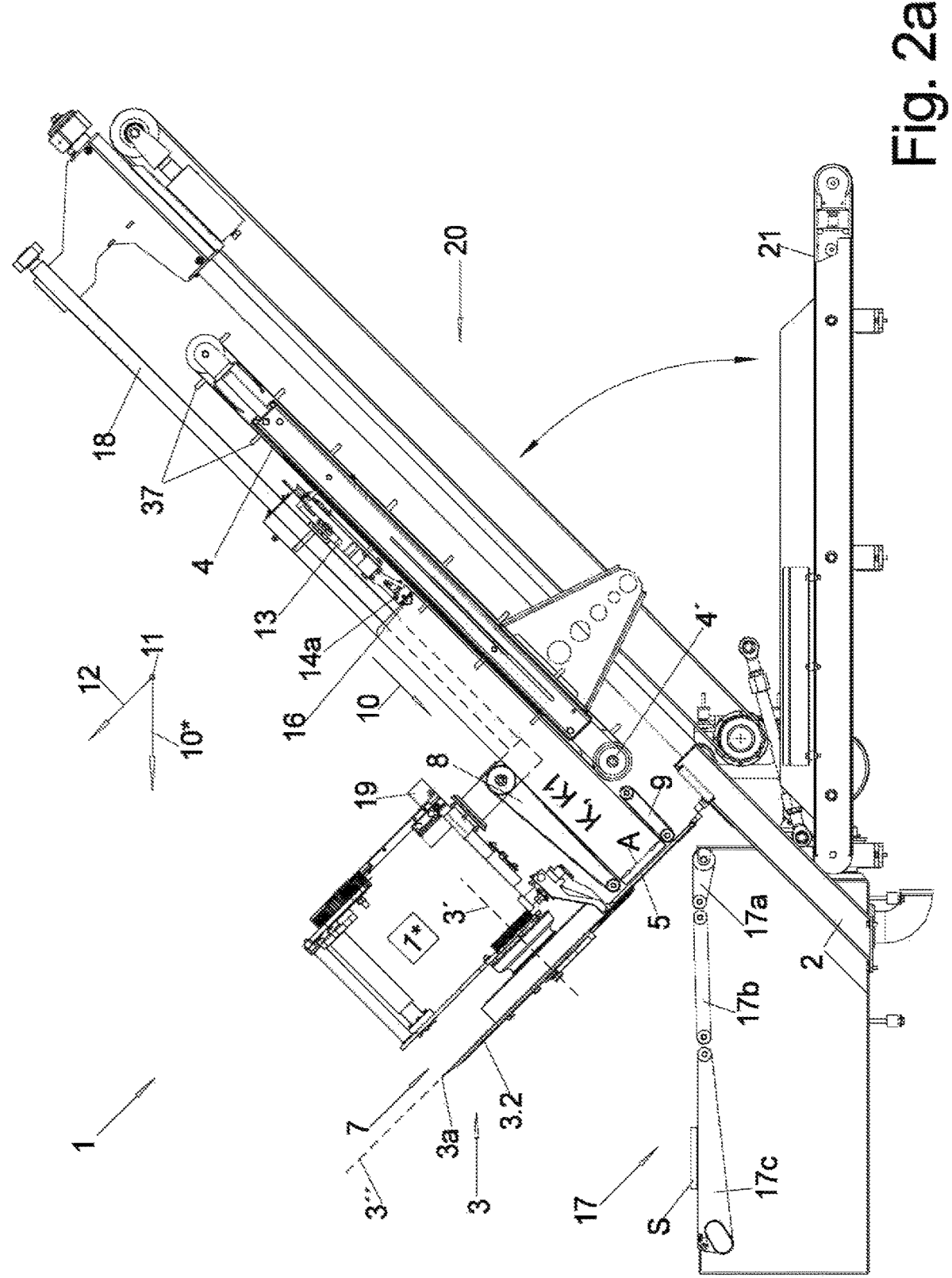
FIG. 2a: a simplified vertical longitudinal section through the slicing machine of FIGS. 1a-c, i.e., in the same viewing direction as FIG. 1c, in which the various conveyor belts are more clearly visible, with the feed belt tilted up into the slicing position.
Figure 2B:
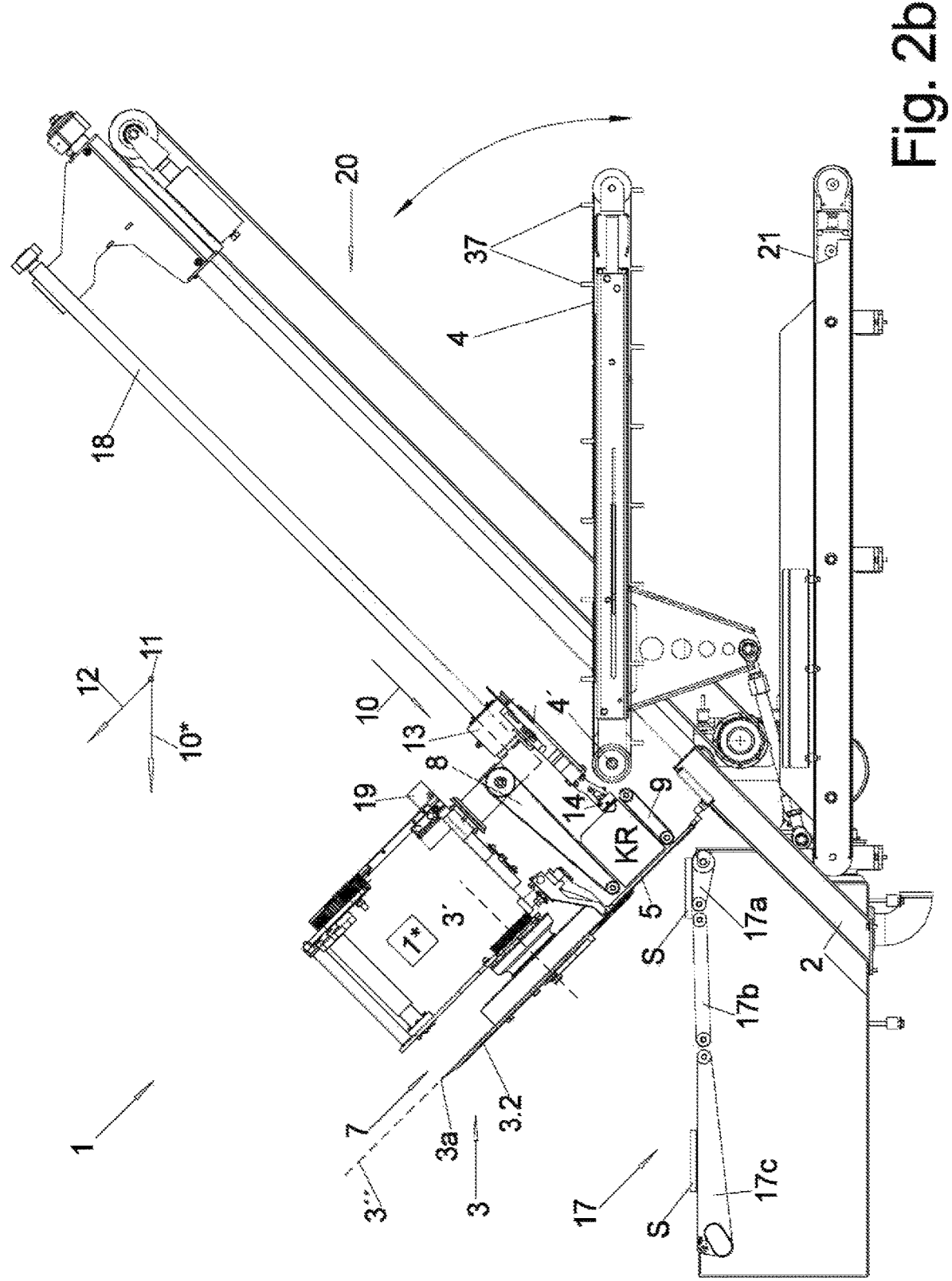
FIG. 2b: a longitudinal section as in FIG. 2a, but with the infeed belt tilted down into the loading position and the product caliber in an advanced state of cutting, FIGS. 3a, b: a first embodiment of an overlapping unit in top view and side view at the beginning of the overlapping process.

FIGS. 1a, 1b show different perspective views of a slicer 1 for simultaneous slicing of several product calibers K side by side—shown only in FIGS. 2a, b—and depositing them in shingled partial portions P1, P2, each consisting of several slices S, or only individual slices S, as shown in FIG. 2b with a general run through direction 10* through the slicer 1 from left to right, and FIG. 1c shows a side view of this slicer 1.

FIG. 2a shows a vertical section through such a slicer 1 with the same viewing direction as FIG. 1c, which is easier to understand by omitting the side covers.

The basic structure of the slicer 1 is that a cutting unit 7 with a rotating sickle blade 3 is fed, in this case, with four product calibers K lying next to each other transversely to the feeding direction 10 by a feed unit 20, from the front ends of which the rotating sickle blade 3 cuts off a slice S in each case during one revolution, i.e., quasi simultaneously.

The feed unit 20 comprises a feed conveyor 4 in the form of an endless, circulating feed belt 4, the upper run of which can be driven at least in the feeding direction 10, and preferably also in the opposite direction. The calibers K rest on the feed belt 4 and are positioned in the transverse direction 11 by spacers 37 which project radially outwards from the feed belt 4.

For cutting the product calibers K, the feed conveyor 4 is in the inclined position shown in FIGS. 1a-c and FIG. 2a with a low-lying front end on the cutting side and a high-lying rear end, from which it can be folded down about a pivot axis 20' running in its width direction, the 1st transverse direction 11, which is located in the vicinity of the cutting unit 7, into an approximately horizontal loading position as shown in FIG. 2b.

The rear end of a caliber K lying in the feed unit 20 is in each case held positively by a gripper 14a-d with the aid of gripper claws 16. These grippers 14a-14d are attached to a common gripper unit 13, which can be moved along a rod-shaped gripper guide 18 in the feed direction 10.

Both the feed of the gripper unit 13 and the feed conveyor 4 can be driven in a controlled manner, but the actual feed speed of the calibers K is effected by a so-called upper and lower driven product guide 8, 9, which engage on the upper side and lower side of the calibers K to be cut in their front end regions near the cutting unit 7.

The front ends of the calibers K are each guided through product openings 6a d provided for each caliber, which are formed in a plate-shaped cutting frame 5. Immediately in front of the front end face of the cutting frame 5, which points obliquely downwards, runs the cutting plane 3", in which the sickle blade 3 rotates with its cutting edge 3a and thus cuts off the projection of the calibers K from the cutting frame 5 as a slice S. The cutting plane 3" is defined by the cutting edge 3a of the sickle blade 3. The cutting plane 3" is spanned by the two transverse directions 11, 12.

Here, the inner circumference of the product openings 6a-d of the cutting edge 3a of the blade 3 serves as a counter cutting edge.

Frequently, the two product guides 8, 9 in the 1st transverse direction 11 are provided separately for each caliber K and can be controlled separately.

The upper product guide 8 can be displaceable in the $2^{nd}$ transverse direction 12—which is perpendicular to the surface of the upper run of the feed conveyor 4 folded up into the cutting position—for adaptation to the height of the caliber K in this direction. Furthermore, at least one of the product guides 8, 9 can be embodied to be pivotable about one of its deflecting rollers 8a, 8b, 9a, 9b in order to be able to change the direction of its conveyor belt resting against the caliber K to a limited extent.

The slices S, which are inclined in space if just cut off, fall onto a discharge unit 17 starting below the cutting frame 5, which in this case consists of several discharge conveyors 17a, b, c arranged one behind the other with their upper runs approximately aligned in the passing direction 10*.

Below the feed unit 20 there is an approximately horizontally running residue conveyor 21, also in the form of an endlessly circulating conveyor belt, which begins with its front end below the cutting frame 5 and directly below or behind the discharge unit 17 and with its upper run transports end pieces falling on it to the rear against the passing direction 10*.

Therefore, at least the first conveyor 17a in the passing direction 10* can be driven with its upper run in the opposite direction to the passing direction 10*, so that an end piece falling thereon, for example, can be transported to the rear and fall onto the lower-lying end piece conveyor 21.

FIGS. 3a, b, 4a, b show a first embodiment of the overlapping unit 30 in a top view and in a side view, respectively.

As shown in FIG. 3a, the overlap unit 30 has two conveyor units 27a, 27b running side by side—which can be part of the discharge conveyor unit 17—shown here as a belt conveyor with an endless belt or conveyor belt running over two deflecting rollers 31, the upper run of which is driven in this case from left to right in a general transport direction 10. However, the two conveyor units 27a, b do not run parallel to each other as seen in plan view, but their transport directions 10a, b as seen in plan view differ by a small intermediate angle α of generally less than 20°, so that the two conveyors 27a, b are at a distance from each other as seen in plan view at the beginning of their transport distance, on the left in FIG. 3a, but are at a smaller distance from each other at the end of their conveying distance, on the right in FIG. 3a, and are in particular as close as possible to each other.

Preferably, the two conveyors 27a, b are each driven by a motor 32 and thus independently of each other, the motors 32 being controlled by a control 30* of the overlapping unit.

Figure 3B:
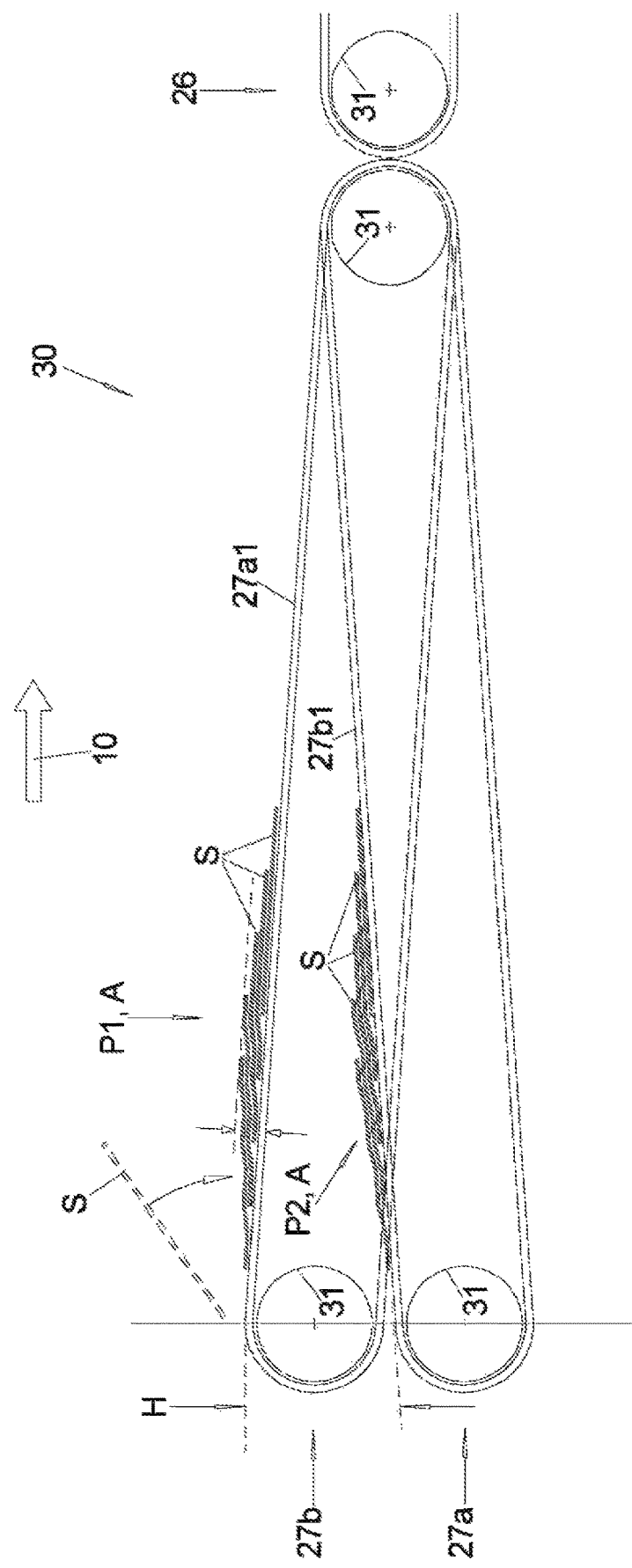
FIG. 3c: a side view of an alternative second embodiment, FIGS. 4a, b: a top and side view of the first embodiment of the overlapping unit at the end of the overlapping process, FIGS. 5a, b: a third embodiment of an overlapping unit in top view and side view at the beginning of the overlapping process.

At the beginning of the transport distance, on the respective support surface 27a1, 27b1 of each of the two conveyor units 27a, b, a partial portion P1 or P2 of slices S shingled in the transport direction 10 is produced or deposited, which can, for example, fall directly from a slicing machine arranged upstream thereof, as shown in the side view of FIG. 3b.

As FIG. 3b further shows, the upper spaces of the two conveyors, i.e., their supporting surfaces 27a1, 27b1, have a height difference H with respect to each other at the beginning of the transport distance, i.e., at the longitudinal position of the axes of rotation of their deflecting rollers 31 lying upstream in the transport direction.

Preferably, the downstream deflecting rollers 31 and/or the upper spaces of the two conveyor units 27a, b are at the same height.

For the overlap, the article A, in this case the partial portion P1, is placed on the support surface 27a1, which is higher at the beginning of the transport section, in such a way that towards the other conveyor unit 27b the article, i.e., the slices S of the partial portion P1, lie as close as possible to the corresponding edge of the support surface 27a1 of the conveyor 27a.

On the other support surface 27b1, on the other hand, the part-portion P2 is produced or placed, preferably at the same longitudinal position, in such a way that it projects in the direction of the other conveyor 27a beyond the corresponding edge of the support surface 27b1 by an overhang Ü1, for which the slices S should of course have a certain rigidity so that they do not hang down too much.

If the two articles A as partial portions P1, P2 are moved, preferably from the beginning, at the same speed, i.e., synchronously, in transport direction 10 by means of the respective conveyor unit 27a, b, they reduce their initial height difference H more and more, until they come into contact with each other close to the downstream deflecting rollers 31, i.e., the end of the transport distance as shown in FIGS. 4a, b—in that the lateral overhang Ü1 of the partial portion P2 rests on the edge region facing it of the partial portion P1 running next to it.

For this purpose, the downstream deflecting rollers 31 or upper spaces must have no difference in height to each other or only such a small difference that the two part portions are in contact with each other, i.e., rest on each other. This is also necessary because, as a rule, downstream of the two conveyor units 27a, b running side by side there is a downstream conveyor 26, here again shown as a belt conveyor, which extends at least over the width of the entire transversely shingled portion, here over the width of the two belt conveyors 27a, b lying side by side in the top view, and picks up and transports away the overlapping entire portion.

In case the different heights of the starts of the two conveyor units 27a, b cause problems, FIG. 3c shows in side view an alternative solution in which both upstream deflecting rollers 31 and both downstream deflecting rollers 31 of the two conveyors 27a, b are at the same height. The height difference H is generated by the fact that the upper run of the conveyor 27a on which the laterally protruding partial portion P1 or article A is placed is guided over a further, middle deflecting roller 31 in the middle area of the transport section, the upper side of which is positioned by the height difference H above the upper side of the downstream and/or upstream deflecting roller 31 of this conveyor.

The transfer of the transversely overlapped whole portion at the end of the two conveyor units 27a, b running side by side to a downstream discharge conveyor 26, as shown in FIGS. 3a to 5b, makes sense since a change of the respective transport direction 10a, b from angular position to each other to parallel position to each other within one and the same belt conveyor 27a, b is not possible or only possible with great constructive effort.

However, if—as shown in FIGS. 5a-c—the conveyor units 27a, b used are not belt conveyors but strap conveyors in which instead of an endlessly circulating belt there are several endlessly circulating straps 25, preferably round straps 25, arranged next to each other transversely to the direction of transport, such a change in the direction of transport, e.g., 10b, is quite possible by means of a deflecting device 28:

Deflecting rollers 31 for a strap conveyor have axially spaced circumferential grooves in their circumferential surface, in each of which one of the strap 25 runs and is thereby positively guided against offset in the transverse direction 11.

As FIG. 5a shows, the transport directions 10a, 10b of the two belt conveyors in the first part of their transport distance again run differently from each other by an intermediate angle α and towards each other in the transport direction 10, so that at the end of these differently aligned partial transport distances the first straps facing the respective other straps are preferably at the same distance from each other as the straps within one of the two strap conveyors.

At this deflection point, as a deflection device for the parallel running of all straps 25 of the two belt conveyor units 27a, b in one of the two strap conveyor units, here 27b, a further deflecting roller 31 with circumferential grooves for the belts 25 is arranged, wherein the grooves therein are so dimensioned relative to the transverse sectional shape of the straps 25 and the straps 25 dip therein to such a depth that they do not jump out of their groove despite the deflection of each strap 25 through a respective one of the circumferential grooves in this deflecting roller 31.

The downstream deflecting roller 31 at the end of the transport distance is preferably continuous over the entire width of the two previously separated conveyor units 27a, b, and this is preferably also the driven deflecting roller, all the circumferential grooves therein being at the same distance from one another in the transverse direction 11.

In this way, a transfer to a subsequent conveyor 26 from the position of overlap of the two partial portions P1, P2 can be avoided for the time being and a transfer to a next unit can only take place substantially further downstream if required.

Such a deflection of the transport direction of the straps of a strap conveyor considered in the top view is all the easier possible, the smaller the extension of the cross section of the individual strap 25 in transverse direction 11 to the height of the cross section.

It is particularly easy to achieve a deflection with round straps, i.e., strap 25 with a round cross section, as shown in FIG. 5c:

In this case, the circumferential grooves for the individual straps of conveyor 27b are not accommodated in a common deflecting roller 31, but each strap 25 is deflected in its circumference by its own deflecting roller 34 with a circumferential groove. The deflecting rollers 34 are thus generally no longer in their axial direction than the diameter of the round strap 25, and the individual deflecting rollers 34 are arranged with their axes of rotation 34' running parallel to one another at a distance corresponding to the distance between the round straps 25 in the transverse direction 11. In this case, the respective main planes of the individual deflecting rollers 34—which are also parallel to one another—which are perpendicular to the respective axis of rotation 34' are inclined with respect to the support surface 27a1 or 27b1 of the strap conveyor at this point, so that the strap 25 cannot slip out of the circumferential groove of the deflecting roller 34 if the latter is sufficiently adapted to the circumferential contour of the round strap 25, as is usually the case.

FIGS. 6a, b, 7a, b show a fourth embodiment of an overlapping unit 30:

Here the articles A to be overlapped, in this case again the partial portions P1, P2, are not arranged on the supporting surface of the upper run of an endlessly circulating belt conveyor or strap conveyor, but each of the articles A, i.e., in this case each of the partial portions P1, P2, is arranged on the upper side of a slide 24a or 24b, respectively, which can be driven in particular independently of each other, which in this case are track-guided, in that they have, for example, projecting downwards from the underside and offset in the transport direction 10, in each case at least two guide elements, such as a guide roller 36 in each case, which are positively guided in the transverse direction 11 in a track guide 23a, b specifying the respective transport direction 10a, 10b.

Of course, a raised component such as a ridge can also be used as a track guide, and conversely there can be guide counter-elements on the slide 24 which engage on both sides from the outside on this raised track guide 23. Likewise, the slides 24 can also be moved in a controlled manner without positive guidance on a flat surface without grooves and elevations or other positive guidance, either with the aid of their own driven and controlled wheels or by means of another drive system.

Analogous to the first embodiment of FIGS. 3a, b, 4a, b, at the beginning of the transport distance the two slides 24a, b have such a distance in the transverse direction 11 that the portion P2 placed on one of the two slides (here 24b) with a lateral projection Ü1 is not in contact with the adjacent slide 24a and the portion P1 placed thereon.

In this initial position, the slides 24a, b again have a height difference H with respect to their upper side, which is preferably greater than the height h of the article A, in this case the part portion P1, which is the lower part portion or article after overlapping.

As shown in FIGS. 6a, b, in the starting position the partial portions P1 and P2 placed on the slides 24a and 24b respectively are both offset and spaced apart from each other in the transverse direction 11 as seen in plan view and also spaced apart from each other in height.

By moving the slides 24a and 24b—preferably at the same speed in transport direction 10—from left to right in these figures, they approach each other in a transverse direction in a region of the transport directions 10a, b which are at an angle to each other, to such an extent that in the final state according to FIG. 7b, viewed from above, the two part portions P1, P2 neither overlap, and viewed from the side, the two part portions P1, P2 rest on each other at least in the overlap region. Since the parallel guidance of the two slides 24, 24b is possible without any problems as soon as this overlapping state is reached, there is no need to transfer the overlapped total portion to a subsequent conveyor.

Another advantage of this solution is that in the initial area of the overlapping unit 30, before the area with an angular course of the two transport directions in 10a, 10b, these two transport directions can also run in parallel, and thus when a shingled partial portion P1, P2 is produced on each of these slides, the longitudinal direction of the shingled partial portion coincides with the transport direction 10a, 10b and the longitudinal direction of the slide, e.g., 24b, in contrast to the embodiment in FIG. 3a.

FIGS. 8a, b show a fifth embodiment in top view and side view, in which figures the non-overlapped initial state and the overlapped final state are drawn side by side in the same representation:

In this case, the conveyor units 27a, b are again shown as belt conveyors, but these two belt conveyors have mutually parallel transport directions 10a, b from the beginning.

In this case, the overlap is achieved by the fact that one of the belt conveyors, here 27b, including its deflecting rollers 31, is displaceable in transverse direction 11, also in the running state of the conveyor belt, and one of the two belt conveyors is displaceable in height, preferably both possibilities of movement being realized on one and the same conveyor unit, here 27b.

This can be achieved by accommodating the deflecting rollers 31 of this displaceable conveyor 27b in a surrounding support frame, for example a frame 35, which can also support the drive for this conveyor 27b, and displacing the entire unit often referred to as a conveyor cassette—both in the transverse direction 11 and in height by means of controlled drives not shown, relative to the transport direction 10.

Thus, when the partial portions P1, P2 placed on the two conveyors 27a, b in the initial area of the transport distance with height spacing and lateral spacing are first displaced in transverse direction by displacement of, for example, that conveyor 27b on which the partial portion P2 rests with lateral overlap Ü1 and then lowered until the two partial portions P1, P2 are in contact, the overlap with the desired degree Ü2 of overlap is achieved.

REFERENCE LIST

1 slicing machine, slicer
1* control
2 base frame
3 blade
3 rotation axis
3" blade plane, cutting plane
3a cutting edge
4 feed conveyor, feed belt
5 cutting frame
6a-d product opening
7 cutting unit
8 upper product guide, upper guide belt
8.1 contact run, lower run
8a cutting side deflecting roller
8b deflecting roller facing away from the cutting side
9 bottom product guide, lower guide belt
8.1 contact run, upper run
9a cutting side deflecting roller
9b deflecting roller facing away from the cutting side
10 transport direction, longitudinal direction, axial direction
10a, b transport direction
10* passage direction through machine
11 1. transverse direction (width slicer)
12 2. transverse direction (height direction caliber)
13 gripper unit, gripper slide
14,14a-d gripper
15 cross bar
15' support surface
16 gripper claw
17 discharge unit
17a, b, c portioning belt, conveyor
18 gripper guide
19 height sensor
20 feed unit 21 end piece conveyor
22 end piece container
23 track guide
24 transport slide
25 strap
26 subsequent conveyor unit
27a, b conveyor unit
27a1 supporting surface
27b1 supporting surface
27a', 27b' running direction
28 deflecting device
29 transverse displace device
30 overlapping unit
31 deflecting roller
32 motor
33 circumferential groove
34 deflecting roller
34' rotation axis
35 frame
36 guide element, guide roller
α intermediate angle
A article
h height article
H height difference of conveyors
K product, product caliber
KR endpiece, caliber endpiece
S slice
P portion
P1, P2 partial portion
Ü1 overlap
Ü2 overlap
V packaging element

The invention claimed is:

1. A method for transverse shingling of articles in a transverse direction relative to a transport direction of a conveying unit which is part of a slicing machine, the method comprising:
depositing one article on each of two conveyor units, wherein
one of the articles is positioned on one of the conveyor units in such a way that the one article projects in a transverse direction to a running direction of the one conveyor unit beyond the one conveyor unit in a direction of the other conveyor unit at least along a section of a transport distance of the one conveyor unit,
at least over a longitudinal region, the two conveyor units are positioned relative to one another in such a way that a supporting surface of the one conveyor unit with the transversely projecting article lies higher than a supporting surface of the other conveyor unit by a height difference at least corresponding to a height of the transversely projecting article,
the two conveyor units are further positioned relative to one another in such a way that the conveyor units, viewed from above, are arranged in the transverse direction without overlapping next to one another so closely that the transversely projecting article overlaps the other article in the transverse direction at least over a longitudinal region, and
subsequently, the height difference of the supporting surfaces of the two conveyor units is reduced at least to such an extent that the two articles come into contact.

2. The method according to claim 1, wherein
the conveyor units transfer the two articles in the transport direction to a subsequent conveyor unit, after a desired degree of lateral overlap of the two articles has been achieved.

3. The method according to claim 2, wherein the transfer to the subsequent conveyor unit is carried out
either for both articles simultaneously
or with an upper article of the two articles in the transverse direction following a lower article of the two articles in the transverse direction.

4. The method according to claim 1, wherein at the latest from a moment of contact of the two articles, the two conveyor units are driven synchronously.

5. The method according to claim 1, wherein,
seen in plan view, running directions of the two conveyor units are directed towards each other at an acute intermediate angle.

6. The method according to claim 5, wherein the acute intermediate angle is less than 30°.

7. The method according to claim 5, wherein the acute intermediate angle is less than 15°.

8. The method according to claim 1, wherein
from a longitudinal position of a reached desired dimension of lateral overlap, running directions of the two conveyor units are aligned parallel to one another,
by deflection of straps running side by side, if at least one of the conveyor units is a strap conveyor including several straps running in parallel,
or by displacing one of the conveyor units toward the other conveyor unit if the two conveyor units run parallel to each other,
or by changing the running direction of at least one of the conveyor units if the at least one conveyor unit is a transport slide.

9. The method according to claim 1, wherein the one article is deposited on the supporting surface of the one conveyor unit already with lateral overhang.

10. The method according to claim 9, wherein the one conveyor unit is a strap conveyor comprising a plurality of parallel-running straps, and at least an outermost strap along the transport distance of this conveyor unit is deflected into a return run ahead of the other straps.

11. The method according to claim 1, wherein
either the two conveyor units are arranged with their supporting surfaces at an upstream end at a same height, but spaced apart from one another in the transverse direction, and are brought to the height difference with respect to one another along a transport distance of each conveyor unit,
or the two conveyor units are arranged with their supporting surfaces at the upstream end at different heights relative to one another at least by the height difference.

12. The method according to claim 1, wherein at least physical parameters of the articles to be overlapped in the transverse direction, including
bending stiffness about an axis directed in the running direction,
and/or
temperature,
and/or
weight,
are determined or known and are taken into account for calculation of the height difference and/or a dimension of the overlap.

13. A slicing machine for carrying out the method according to claim 1, the slicing machine comprising:
a cutting unit,
a feed unit for feeding a plurality of product calibers side by side to the cutting unit for simultaneously cutting slices from the product calibers, a plurality of discharge units arranged side by side, each having a plurality of discharge conveyors arranged one behind the other in the transport direction, for discharging the slices cut by the slicing machine, and a control for controlling moving parts of the slicing machine, wherein at least two discharge conveyors of the plurality of discharge units, which are adjacent to each other when viewed from above, are the conveyor units.

14. The method according to claim 1, wherein the one article is deposited initially without lateral overhang on the supporting surface of the one conveyor unit at an article feed point, downstream of which the supporting surface of the one conveyor unit becomes narrower from a side on which lateral overhang is desired along the transport distance of the one conveyor unit.

15. An overlapping unit for transversely shingling articles with an overlap in a direction transverse to a transport direction, the overlapping unit comprising:

two conveyor units lying side by side in a transverse direction relative to running directions of the two conveyor units as seen in plan view, wherein supporting surfaces of the two conveyor units, at least over a longitudinal range of the two conveyor units, can differ or differ by a height difference at least corresponding to a height of one of the articles; and a control for controlling moving parts of the overlapping unit;

wherein the conveyor units are or can be arranged closely adjacent to one another in the transverse direction as seen in plan view without overlapping at least over a longitudinal region of conveyor paths of the conveyor units, at least an upper run of one of the conveyor units is or can be arranged higher than an upper run of the other conveyor unit at least over a longitudinal region of a conveying distance of the one conveyor unit by at least a height of an article positioned on the one conveyor unit, and the control is embodied to control the conveyor units so that the article positioned on the one conveyor unit will overlap an article positioned on the other conveyor unit in the transverse direction during operation of the conveyor units, wherein from a longitudinal position of reaching a desired dimension of lateral overlap, the running directions of the two conveyor units are aligned parallel to one another either by a deflecting device for straps running side by side of at least one of the conveyor units, if the at least one conveyor unit is a strap conveyor, or by changing a direction of a track guide if at least one of the conveyor units comprises a transport slide guided in the track guide.

16. The overlapping unit according to claim 15, wherein viewed in plan view the running directions of the two conveyor units are directed towards each other in the transport direction.

17. The overlapping unit according to claim 15, wherein either the two conveying units with their supporting surfaces at an upstream end are at a same height, but spaced apart from one another in the transverse direction, and are brought to the height difference from one another along a transport distance of each conveyor unit, or the two conveying units with their supporting surfaces at the upstream end are at different heights relative to one another at least by the height difference.

18. The overlapping unit according to claim 15 further comprising a transverse displacing device configured to displace one of the conveyor units toward the other conveyor unit.

19. A method for transverse shingling of articles in a transverse direction relative to a transport direction of a conveying unit which is part of a slicing machine, the method comprising:

depositing one article on each of two conveyor units, wherein one of the articles is positioned on one of the conveyor units in such a way that the one article projects in a transverse direction to a running direction of the one conveyor unit beyond the one conveyor unit in a direction of the other conveyor unit at least along a section of a transport distance of the one conveyor unit, at least over a longitudinal region, the two conveyor units are positioned relative to one another in such a way that a supporting surface of the one conveyor unit with the transversely projecting article lies higher than a supporting surface of the other conveyor unit by a height difference at least corresponding to a height of the transversely projecting article, and the two conveyor units are further positioned relative to one another in such a way that the conveyor units, viewed from above, are arranged in the transverse direction without overlapping next to one another so closely that the transversely projecting article overlaps the other article in the transverse direction at least over a longitudinal region, wherein from a longitudinal position of a reached desired dimension of lateral overlap, running directions of the two conveyor units are aligned parallel to one another, by deflection of straps running side by side, if at least one of the conveyor units is a strap conveyor including several straps running in parallel, or by displacing one of the conveyor units toward the other conveyor unit if the two conveyor units run parallel to each other, or by changing the running direction of at least one of the conveyor units if the at least one conveyor unit is a transport slide.

20. A method for transverse shingling of articles in a transverse direction relative to a transport direction of a conveying unit which is part of a slicing machine, the method comprising:

depositing one article on each of two conveyor units, wherein one of the articles is positioned on one of the conveyor units in such a way that the one article projects in a transverse direction to a running direction of the one conveyor unit beyond the one conveyor unit in a direction of the other conveyor unit at least along a section of a transport distance of the one conveyor unit, at least over a longitudinal region, the two conveyor units are positioned relative to one another in such a way that a supporting surface of the one conveyor unit with the transversely projecting article lies higher than a supporting surface of the other conveyor unit by a height difference at least corresponding to a height of the transversely projecting article, and the two conveyor units are further positioned relative to one another in such a way that the conveyor units, viewed from above, are arranged in the transverse direction without overlapping next to one another so closely that the transversely projecting article overlaps the other article in the transverse direction at least over a longitudinal region, wherein at least physical parameters of the articles to be overlapped in the transverse direction, including bending stiffness about an axis directed in the running direction, and/or temperature, and/or weight, are determined or known and are taken into account for calculation of the height difference and/or a dimension of the overlap.

\* \* \* \* \*